(12) United States Patent
Dai et al.

(10) Patent No.: US 8,095,941 B2
(45) Date of Patent: Jan. 10, 2012

(54) SYSTEM FOR PORTION OF A DAY OUT OF OFFICE NOTIFICATION

(75) Inventors: Hong Dai, Westford, MA (US); Corinne M Ryan, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 1276 days.

(21) Appl. No.: 11/470,677

(22) Filed: Sep. 7, 2006

(65) Prior Publication Data

US 2008/0127204 A1   May 29, 2008

(51) Int. Cl.
G06F 9/44 (2006.01)
G06F 15/16 (2006.01)

(52) U.S. Cl. .............................. 719/328; 709/206

(58) Field of Classification Search .............. 709/204, 709/206; 719/328
See application file for complete search history.

(56) References Cited

U.S. PATENT DOCUMENTS

| 2005/0132006 A1* | 6/2005 | Horvitz et al. | 709/204 |
| 2006/0168062 A1* | 7/2006 | Hebert et al. | 709/206 |
| 2007/0100978 A1* | 5/2007 | Levi et al. | 709/223 |

OTHER PUBLICATIONS

Stephen J.H.Yang, "Context Aware Ubiquitous Learning environments for Peer-to-Peer collaborative Learning", 2006.*

* cited by examiner

*Primary Examiner* — LeChi Truong
*Assistant Examiner* — Abdou Seye
(74) *Attorney, Agent, or Firm* — Cantor Colburn LLP; Raymond Szeto

(57) ABSTRACT

A system for generating an electronic notice programmed to display a portion of a day out of the office notice. The system including an application server node configured to execute a personal information management application. An application programming interface is programmatically associated with the personal information management application for allowing requests for services to be transmitted to the personal information management application. At least one of a rich client delegate and a remote EJB housing the API, the rich client delegate and the remote EJB being programmatically associated with the application server node and the personal information management application. The rich client delegate being configured to receive and transmit data to the API via a network. At least one client node is operably associated with the application server node via the network. Each client node having a user interface (UI) that is programmatically associated with the personal information management application.

2 Claims, 3 Drawing Sheets

*FIG. 2*

SYSTEM FOR PORTION OF A DAY OUT OF OFFICE NOTIFICATION

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates in general to personal information management applications, and more particularly, to a system that generates an electronic notice that displays a portion of a day out of office notice.

2. Description of Background

Out of office features in existing applications such as Lotus Notes, IBM Workplace, and Microsoft Outlook all implement a way to take a number of days off from one day to many days. Yet, none of these applications contain the feature of letting a person take a half-day or in more general terms, x days and x hours off.

When creating an out of office notification in Lotus Notes and the user wishes to take a half day off, the user enters the start date and the return date. Then the user manipulates around the existing implementation by setting the notification to out for a half a day in the subject line or the body of the notification in order to attempt to notify others of their partial absence day. The only way the user can get the notifications for out of office to fire off during a fraction of a day with current implementations is to physically turn off (disable) the application after half a day or turn it on (enable) the application part way through the day.

Thus, there is a need to allow a user the ability to be able to generate an out of office notification that will distribute out of office notification to senders for only a limited number of hours (a partial day).

SUMMARY OF THE INVENTION

The shortcomings of the prior art are overcome and additional advantages are provided through the provision of a system for generating an electronic notification containing a portion of a day out of office notice. The system includes an application server node operably associated with a database server having an application data supporting PIM system, the application server node configured to execute a personal information management application, the application server node further configured to store the personal information management application. An application programming interface (API) being programmatically associated with the personal information management application for allowing requests for services to be transmitted to the personal information management application. The system further includes a rich client delegate and a remote EJB housing the API, the rich client delegate and the remote EJB are programmatically associated with the application server node and the personal information management application, the rich client delegate being configured to transmit and receive data to the API via a network. At least one client node is operably associated with the application server node via the network, each client node having a user interface (UI) that is programmatically associated with the personal information management application and the API such that the user may input date with timestamp to the minute data into the UI and transmit the data from the client node to the API. One rich client delegate per client application is programmatically supported by a business logic member. The business logic member being configured to receive the date with timestamp to the minute data entered by the user via the UI via the supporting business logic. The rich client delegate is further configured to transmit the data to the API of the remote EJB.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution for a system for generating an electronic notification containing a portion of a da out of office notice.

BRIEF DESCRIPTION OF THE DRAWINGS

The subject regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2 illustrates one example of an electronic notification in accordance with the disclosed invention.

The detailed description explains an exemplary embodiment of the invention, together with advantages and features, by way of example with reference to the drawings.

DETAILED DESCRIPTION OF THE INVENTION

Figure 1:
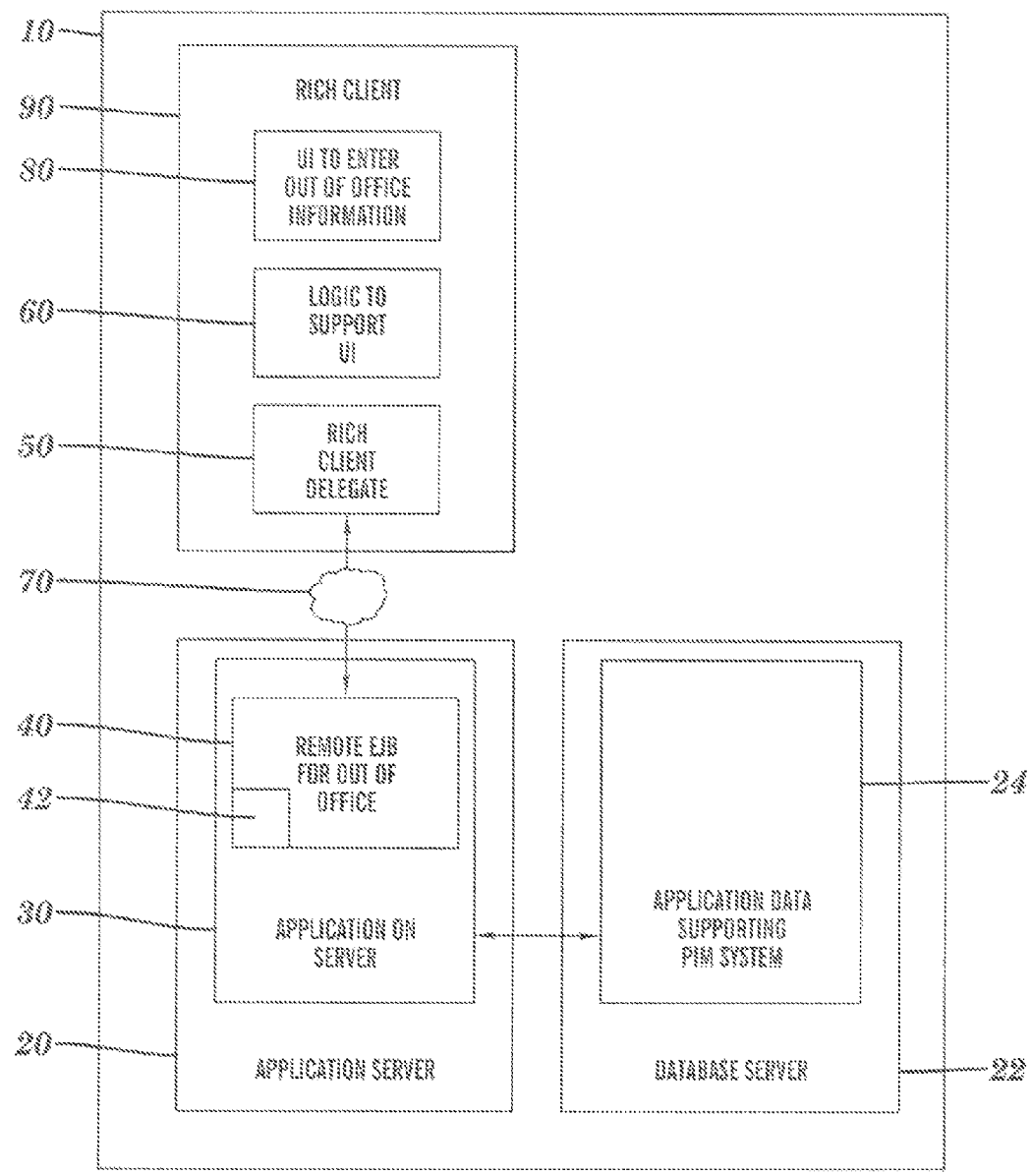
FIG. 1 illustrates one example of a system for generating an electronic notification.

Referring to FIG. 1, a system 10 for generating an electronic notification containing a portion of a day out of office notice, is shown. The system 10 includes an application server node 20 being operably associated with a database server 22 having an application data supporting PIM system 24. The application server node 20 is configured to execute a personal information management application 30. The application server node 20 is further configured to store the personal information management application 30.

Figure 3:
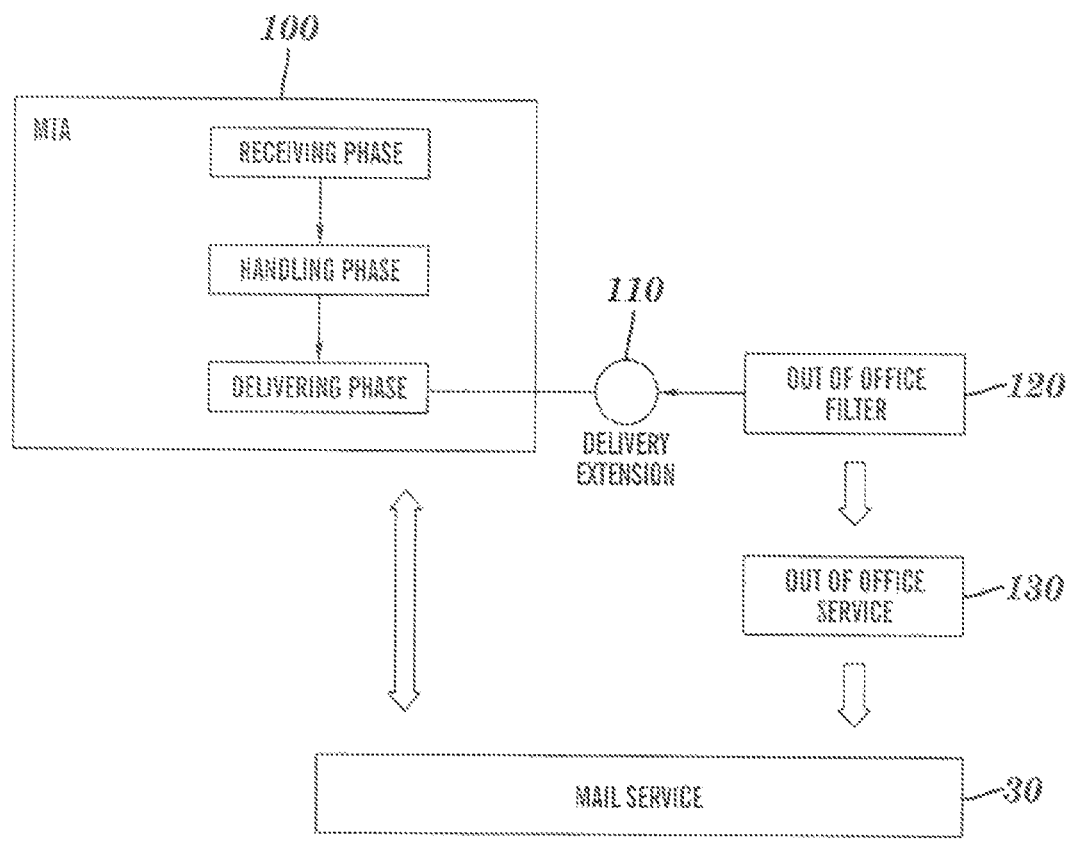
FIG. 3 illustrates one example of a schematic diagram of the disclosed system.

Referring to FIG. 3, the application server node 20 further includes a mail transfer agent (MTA) 100. The mail transfer agent 100 is programmatically associated with the personal information management application 30 and an application programming interface (API) 42. The mail transfer agent 100 includes three phases, (i) a receiving phase for the SMTP server, (ii) a handling phase for handling name resolution, group expansion and content analysis, and (iii) a delivering phase for performing local and external mail delivery. The MTA 100 includes an out of office filter member 120. The out of office filter member 120 is programmatically configured to be a plug-in to a delivery extension member 110 and, is operably associated with an out of office service 130.

The delivery phase includes the delivery extension member 110 for allowing plug-ins to add new functionalities. The delivery extension member 110 is programmatically associated with the personal information management application 30 and the API 42.

The API 42 is programmatically associated with the personal information management application 30. The API 42 allows request for services to be transmitted to the personal information management application 30.

At least one of a rich client delegate 50 or a remote EJB 40 housing the API 42 is programmatically associated with the application server node 20 and the personal information management application 30. The rich client delegate 50 is configured to transmit data to the API 42. The rich client delegate 50 and the remote EJB 40 are configured to receive the transmitted data from a client node 90 via a business logic member 60 and forward the data to the API 42. The API 42 is further configured to forward the transferred data to the MTA 100. At least one client node 90 is operably associated with the application server node 20 via the network 70.

Figure 2:
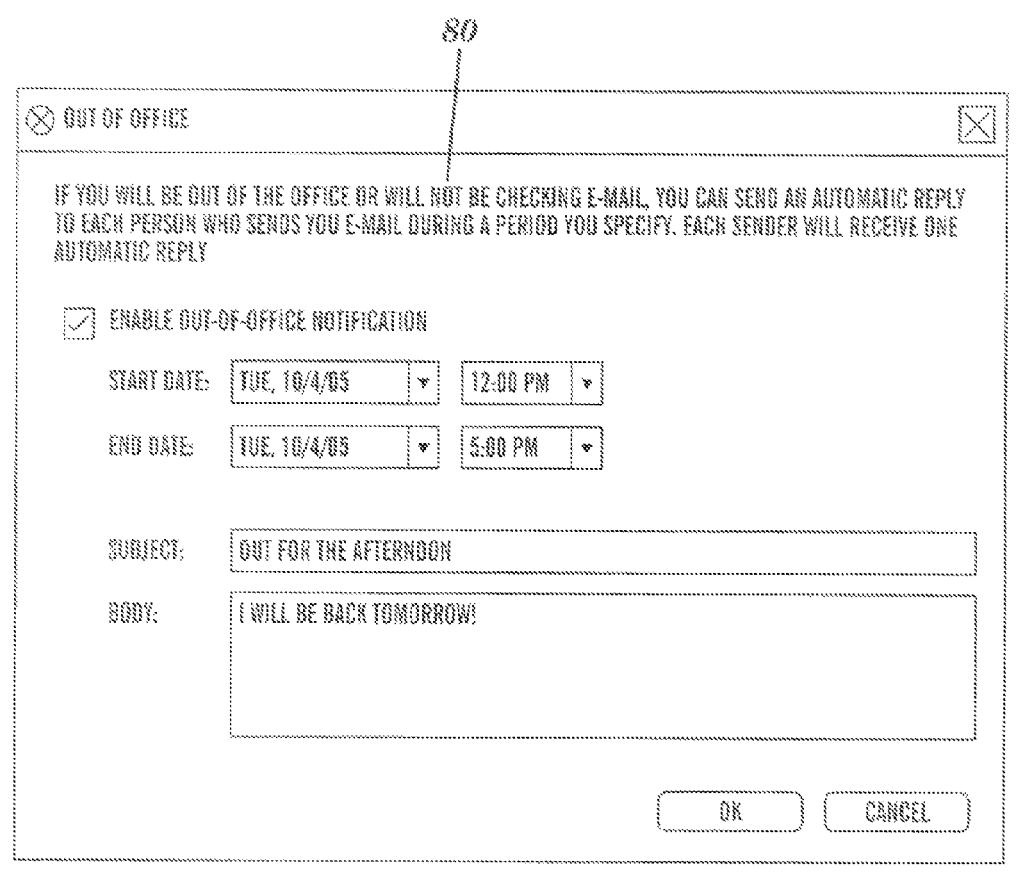

Referring to FIG. 2, where an exemplary user interface (UI) 80 is shown. Each client node 90 includes the user interface (UI) 80, which is programmatically associated with the personal information management application 30 and the API 42. The user may input date with timestamp to the minute data into the UI 80 and transmit the data from the rich client delegate 50 to the API 42 of the remote EJB 40.

One rich client delegate 50 is programmatically supported by the business logic member 60. The business logic member 60 is configured to receive the data with timestamp to the minute data entered by the user via the UI 80 by way of the supporting business logic member 60. The rich client delegate 50 is further configured to transmit the date to the API 42 of the remote EJB 40.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A system for generating an electronic notification containing a portion of a day out of office notice, comprising:
    an application server node operably associated with a database server having an application data supporting personal information management (PIM) system, the application server node configured to execute a personal information management application, the application server node further configured to store the personal information management application;
    an application programming interface (API) programmatically associated with the personal information management application for allowing requests for services to be transmitted to the personal information management application;
    at least one of a rich client delegate and a remote enterprise Java bean (EJB) housing the API, the rich client delegate and the remote EJB are programmatically associated with the application server node and the personal information management application, the rich client delegate being configured to receive and transmit data to the API via a network;
    at least one client computer operably associated with the application server node via the network, each client computer having a user interface (UI) that is programmatically associated with the personal information management application and the API such that a user may input date with timestamp to-the-minute data corresponding to an out of office time period into the UI and transmit the date with timestamp to-the-minute data from the client computer to the API; and
    wherein one rich client delegate is programmatically supported by a business logic member, the business logic member being configured to receive the date with timestamp to-the-minute data entered by the user via the UI by way of the supporting business logic member, the rich client delegate further configured to transmit the date with timestamp to-the-minute data to the API of the remote EJB;
    wherein the application server node further includes a mail transfer agent (MTA), the mail transfer agent being programmatically associated with the personal information management application and the API;
    wherein the mail transfer agent includes three phases, (i) a receiving phase for the an Simple Mail Transfer Protocol (SMTP) server (ii) a handling phase for handling name resolution, group expansion and content analysis, and (iii) a delivering phase for performing local and external mail delivery, wherein the delivery phase includes a delivery extension member for allowing plug-ins to add new functionalities, the delivery extension member being programmatically associated with the personal information management application and the API;
    wherein the MTA includes an out of office filter member, the out of office filter member being programmatically configured to be a plug-in to the delivery extension member, wherein the MTA includes an out of office service; and
    wherein the rich client delegate and the remote EJB are configured to receive the transmitted data from the client computer and forward the data to the API.

2. The system of claim 1, wherein the API is further configured to forward the transferred data to the MTA.

* * * * *